(12) United States Patent
Yajima et al.

(10) Patent No.: US 11,062,185 B2
(45) Date of Patent: Jul. 13, 2021

(54) CONVERTING APPARATUS, PRINTING SYSTEM, AND NON-TRANSITORY COMPUTER READABLE MEDIUM

(71) Applicant: FUJIFILM BUSINESS INNOVATION CORP., Tokyo (JP)

(72) Inventors: Masahiko Yajima, Kanagawa (JP); Masanobu Otaki, Kanagawa (JP); Katsuhito Habaguchi, Kanagawa (JP); Takashi Kojima, Kanagawa (JP); Takemichi Ushiro, Kanagawa (JP); Hirokazu Tanaka, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 181 days.

(21) Appl. No.: 16/193,466

(22) Filed: Nov. 16, 2018

(65) Prior Publication Data

US 2019/0164025 A1 May 30, 2019

(30) Foreign Application Priority Data

Nov. 29, 2017 (JP) .............................. JP2017-228507
May 25, 2018 (JP) .............................. JP2018-100412

(51) Int. Cl.
*G06F 3/12* (2006.01)
*G06K 15/02* (2006.01)

(52) U.S. Cl.
CPC ......... *G06K 15/1809* (2013.01); *G06F 3/125* (2013.01); *G06F 3/1206* (2013.01); *G06F 3/1227* (2013.01); *G06K 15/186* (2013.01); *G06K 15/1811* (2013.01); *G06K 15/1859* (2013.01)

(58) Field of Classification Search
None
See application file for complete search history.

(56) References Cited

U.S. PATENT DOCUMENTS

| 8,582,147 B2 | 11/2013 | Sato |
| 2006/0109492 A1* | 5/2006 | Inoue ................... G06F 3/1244 358/1.13 |
| 2019/0369927 A1* | 12/2019 | Yajima .................. G06F 3/1251 |

FOREIGN PATENT DOCUMENTS

| JP | 2002-055792 A | 2/2002 |
| JP | 2010-026578 A | 2/2010 |
| JP | 2015-061087 A | 3/2015 |

* cited by examiner

*Primary Examiner* — Dov Popovici
(74) *Attorney, Agent, or Firm* — Oliff PLC

(57) ABSTRACT

A converting apparatus includes a converter, an extractor, and a generating unit. The converter converts print data described in a first description language into print data described in a second description language. The extractor extracts command information related to an imposition process from the print data described in the first description language. The generating unit analyzes the command information extracted by the extractor so as to generate information for specifying print-layout definition information to be used from multiple pieces of print-layout definition information stored in a printer that is to execute a printing process. The multiple pieces of print-layout definition information have different imposition processes defined therein.

11 Claims, 19 Drawing Sheets

FIG. 7

| FILENAME | DUPLEX/ SIMPLEX | LOGICAL PAGE SIZE | LOGICAL PAGE ORIENTATION | NUMBER OF IMPOSITIONS | IMPOSITION DIRECTION | OUTPUT PAGE SIZE |
|---|---|---|---|---|---|---|
| D-A4Land-4upL-19×12 | DUPLEX | A4 | LANDSCAPE | 4 | HORIZONTAL | 19×12 (INCHES) |
| D-A4Port-4upL-19×19 | DUPLEX | A4 | PORTRAIT | 4 | HORIZONTAL | 19×19 (INCHES) |
| S-A4Land-2upL-A4 PORTRAIT | SIMPLEX | A4 | LANDSCAPE | 2 | HORIZONTAL | A4 PORTRAIT |
| D-A4Land-8upP-A3 LANDSCAPE | DUPLEX | A4 | LANDSCAPE | 8 | VERTICAL | A3 LANDSCAPE |
| S-B5Port-1upL-B5 PORTRAIT | SIMPLEX | B5 | PORTRAIT | NONE | — | B5 PORTRAIT |

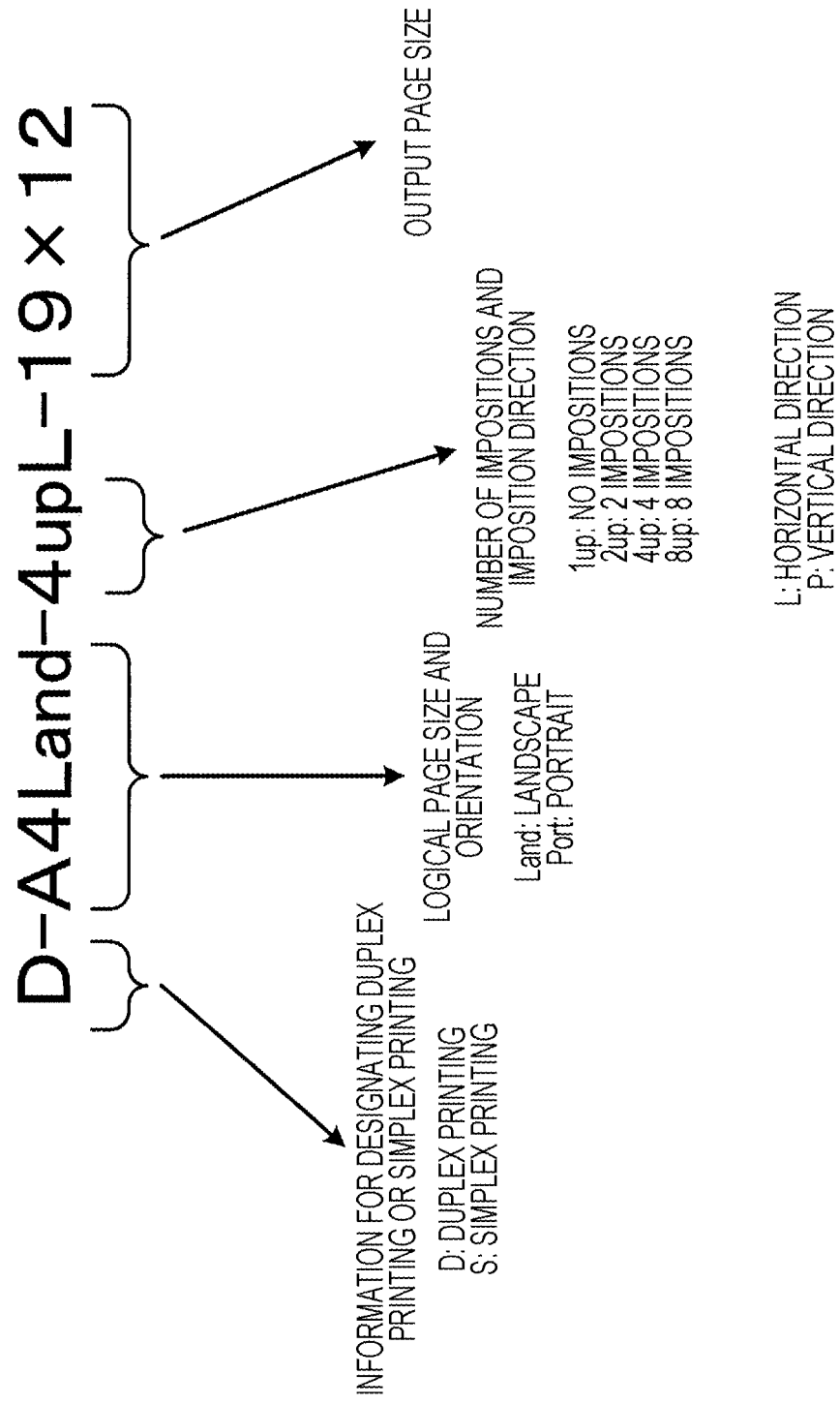

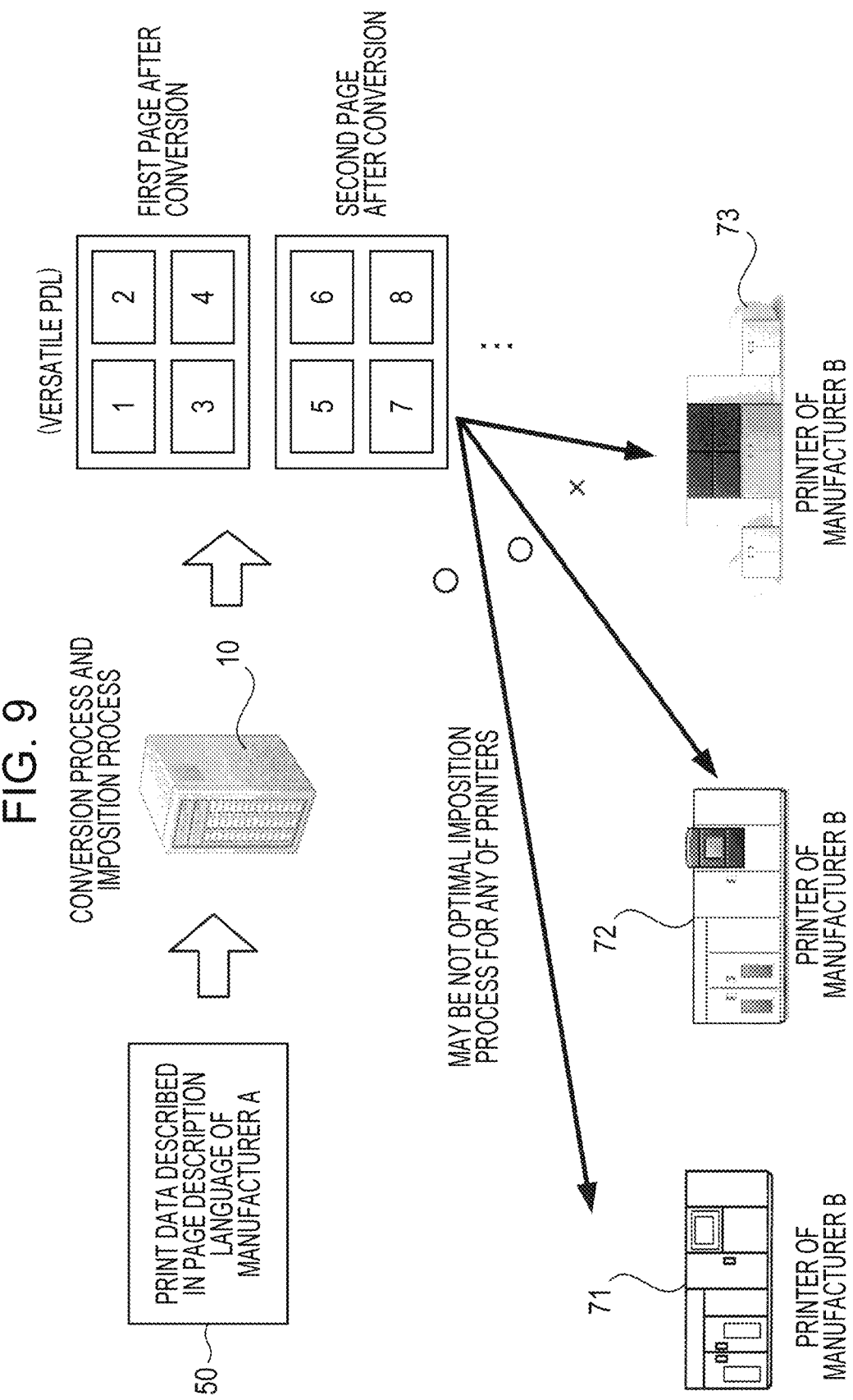

BACK FACE

FRONT FACE

PORTRAIT ORIENTATION

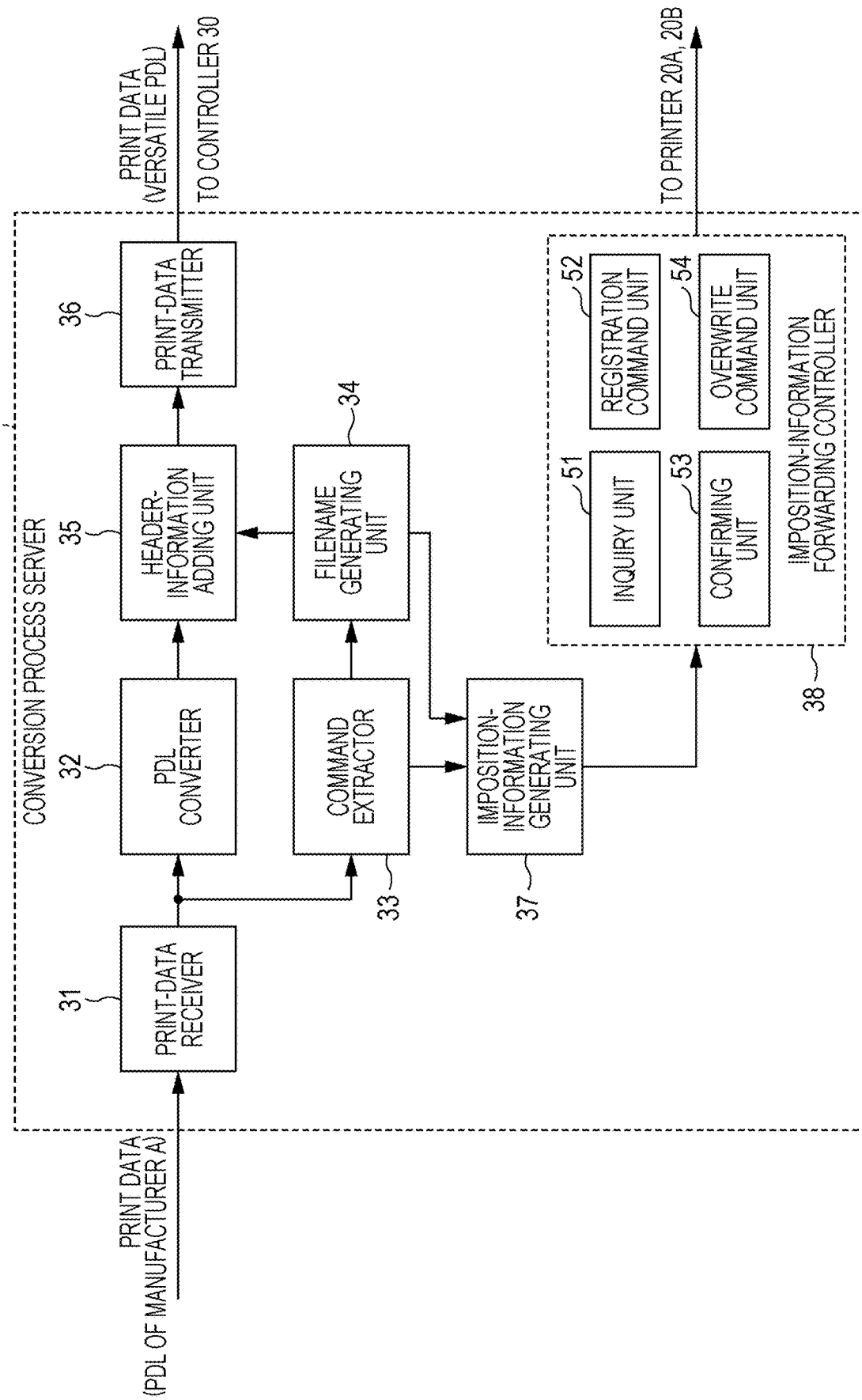

CONVERTING APPARATUS, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-228507 filed Nov. 29, 2017 and Japanese Patent Application No. 2018-100412 filed May 25, 2018.

BACKGROUND

Technical Field

The present invention relates to converting apparatuses, printing systems, and non-transitory computer readable media.

SUMMARY

According to an aspect of the invention, there is provided a converting apparatus including a converter, an extractor, and a generating unit. The converter converts print data described in a first description language into print data described in a second description language. The extractor extracts command information related to an imposition process from the print data described in the first description language. The generating unit analyzes the command information extracted by the extractor so as to generate information for specifying print-layout definition information to be used from multiple pieces of print-layout definition information stored in a printer that is to execute a printing process. The multiple pieces of print-layout definition information have different imposition processes defined therein.

BRIEF DESCRIPTION OF THE DRAWINGS

Exemplary embodiments of the present invention will be described in detail based on the following figures, wherein:

FIG. 7 illustrates a specific example of imposition information stored in an imposition-information storage unit;

FIG. 8 is a diagram for explaining a rule for a filename of the imposition information;

FIG. 9 is a diagram for explaining why a PDL conversion process and an imposition process are not simultaneously performed in the conversion process server;

FIG. 15 is a block diagram illustrating a functional configuration of a conversion process server according to another exemplary embodiment of the present invention;

DETAILED DESCRIPTION

Exemplary embodiments of the present invention will be described in detail below with reference to the drawings.

Figure 1:
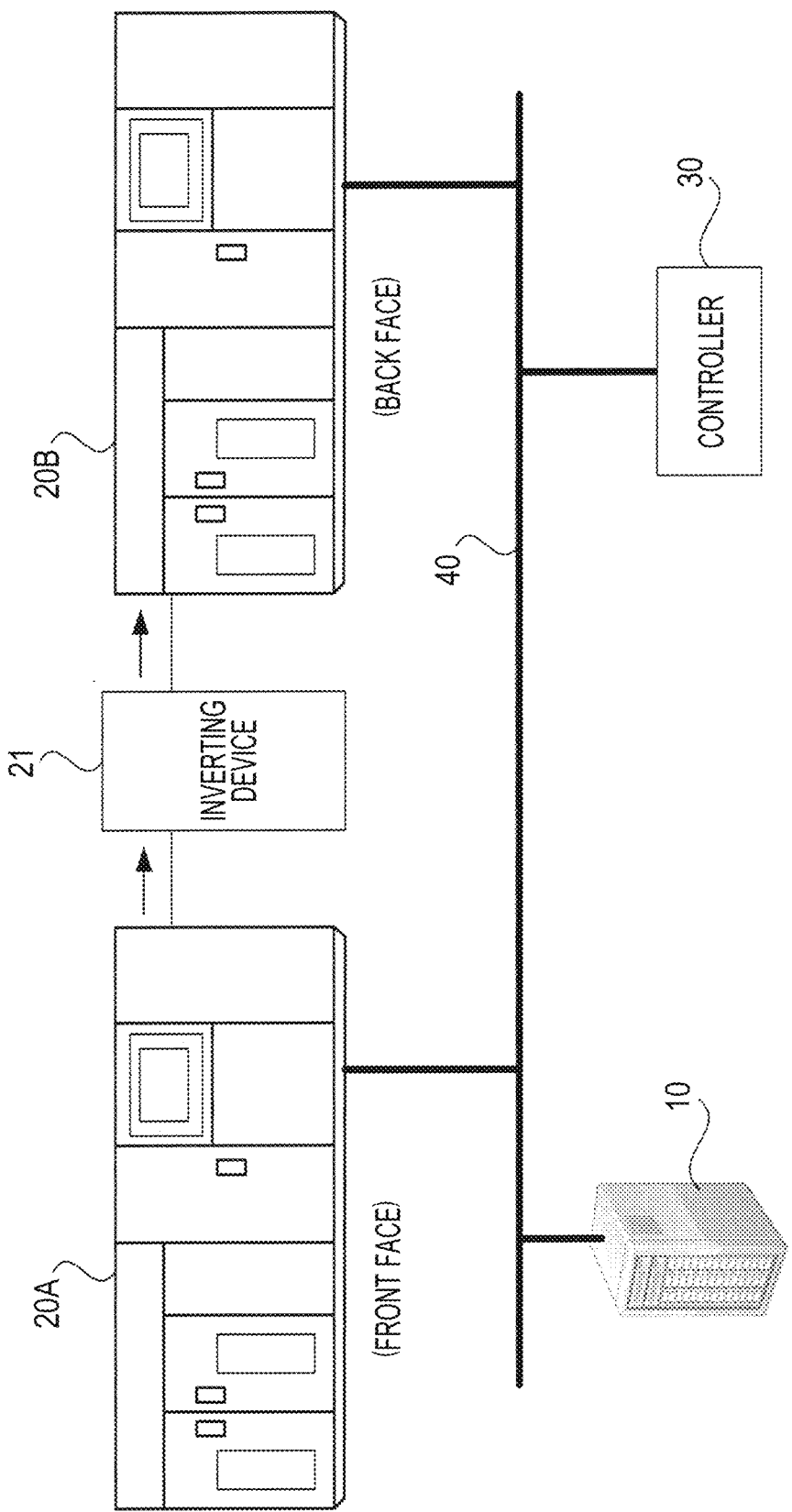
FIG. 1 illustrates a system configuration of a printing system according to an exemplary embodiment of the present invention.

FIG. 1 illustrates a system configuration of a printing system according to an exemplary embodiment of the present invention.

As shown in FIG. 1, an image forming system according to an exemplary embodiment of the present invention includes a conversion process server (converting apparatus) 10, two printers 20A and 20B, and a controller 30, which are connected to one another by a network 40, and also includes an inverting device 21.

The printers 20A and 20B in the printing system according to this exemplary embodiment are so-called continuous-sheet printers that perform printing on a continuous sheet. The printer 20A is provided for performing printing on the front face of the continuous sheet, and the printer 20B is provided for performing printing on the back face of the continuous sheet. The continuous sheet that has undergone printing on the front face thereof in the printer 20A is inverted in the inverting device 21 before being fed to the printer 20B.

The controller 30 controls the printers 20A and 20B such that a printing process is executed based on received print data (i.e., print job).

Furthermore, the conversion process server 10 performs a process for converting the print data described in a certain page description language (PDL) into print data described in a PDL different from the certain PDL, for example, a versatile PDL such as a PDL in a PostScript (registered trademark) format (referred to as "PS format" hereinafter). The format of the print data is not limited to a PDL and may alternatively be a text data format, such as a comma-separated value (CSV) format.

The reasons for performing the PDL conversion process using the conversion process server 10 in this manner will be described below with reference to FIGS. 2 and 3.

In output work where a large-volume high-speed printing process is demanded, a continuous-sheet printer is often used. In such a business-oriented continuous-sheet printer, the printing process is performed by using print data described in a dedicated PDL unique to each manufacturer. Such print data described in a dedicated PDL unique to each manufacturer is often used not only in a continuous-sheet printer but also in a business-oriented printer capable of performing a high-speed printing process.

Figure 2:
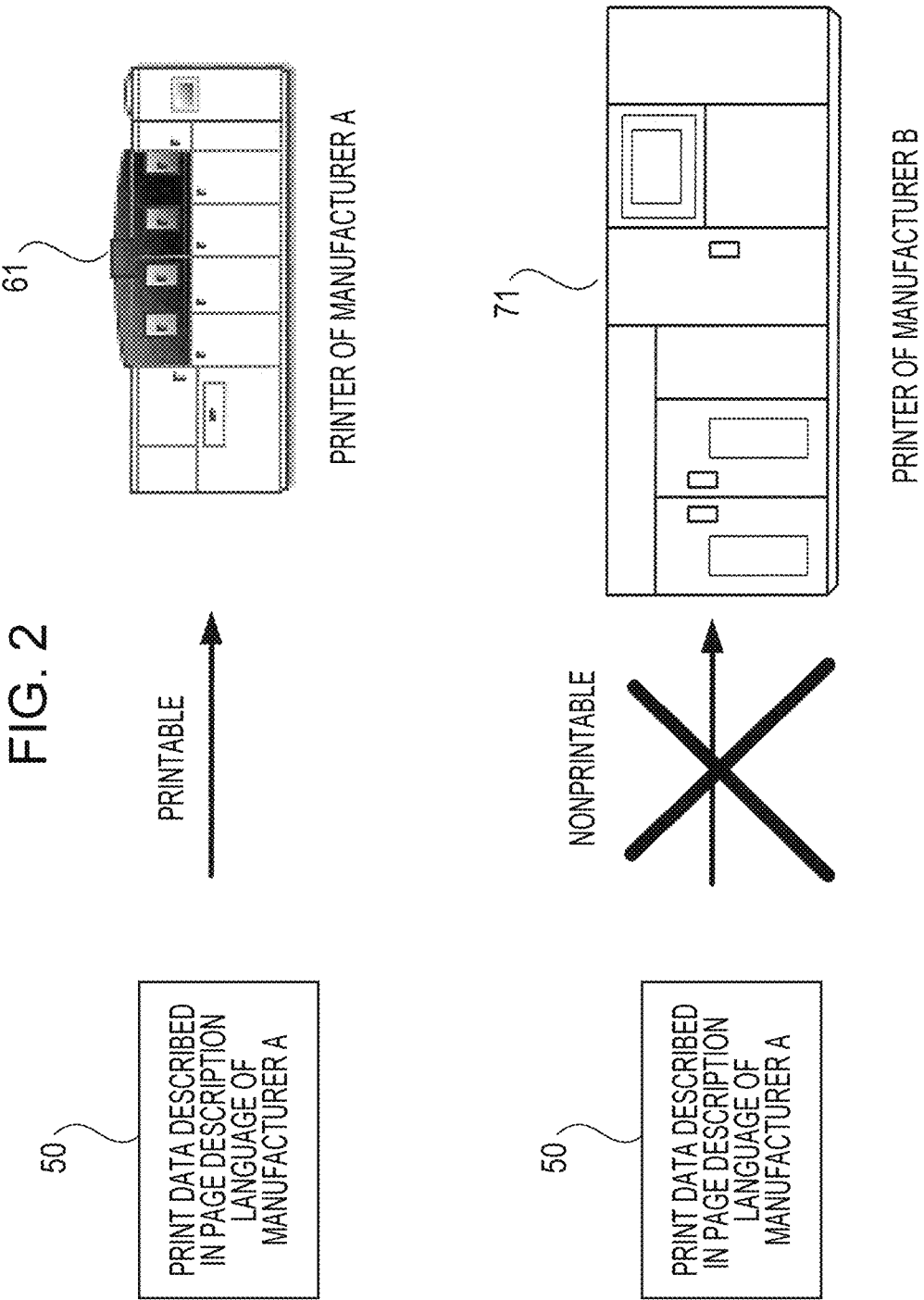
FIG. 2 is a diagram for explaining why a page-description-language (PDL) conversion process is performed by a conversion process server.
Figure 3:
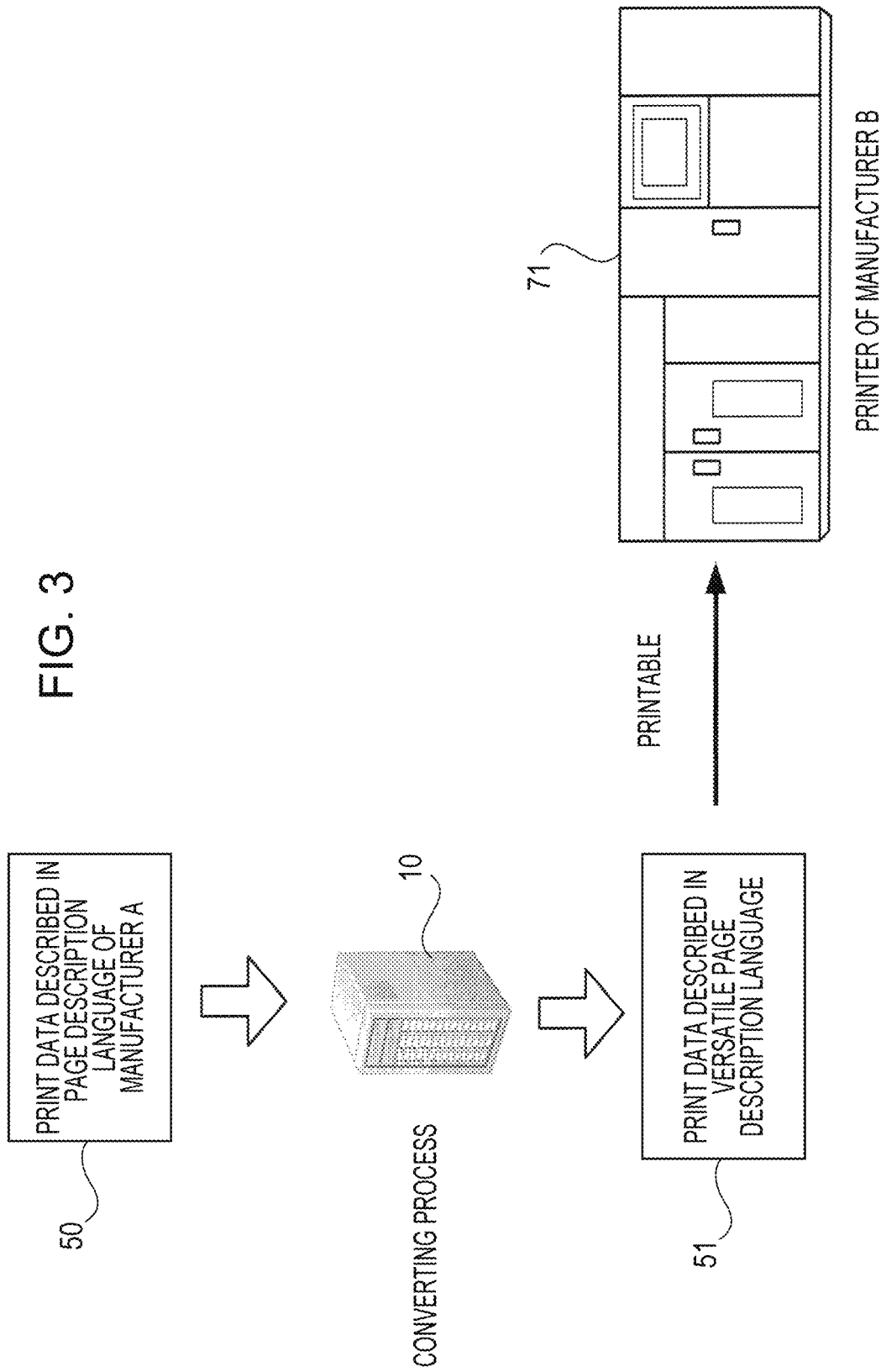
FIG. 3 is another diagram for explaining why the PDL conversion process is performed by the conversion process server.

As shown in FIG. 2, a printing process using a printer 61 of manufacturer A is executable by using print data 50 described in a PDL of manufacturer A. However, a printing process using a printer 71 of manufacturer B may sometimes be not executable by using the print data 50 described in the PDL of manufacturer A.

Therefore, when using print data described in a PDL of a certain manufacturer to perform a printing process using a printer of another manufacturer, it is necessary to recreate print data in a format printable in the printer of the other manufacturer. In order to eliminate such a task, the conversion process server 10 converts the print data 50 described in the PDL of manufacturer A into print data 51 described in, for example, a versatile PDL, as shown in FIG. 3.

Because the print data 51 described in the versatile PDL is interpretable in the printer 71 of manufacturer B, a printing process is executable in the printer 71 of manufacturer B.

Figure 4:
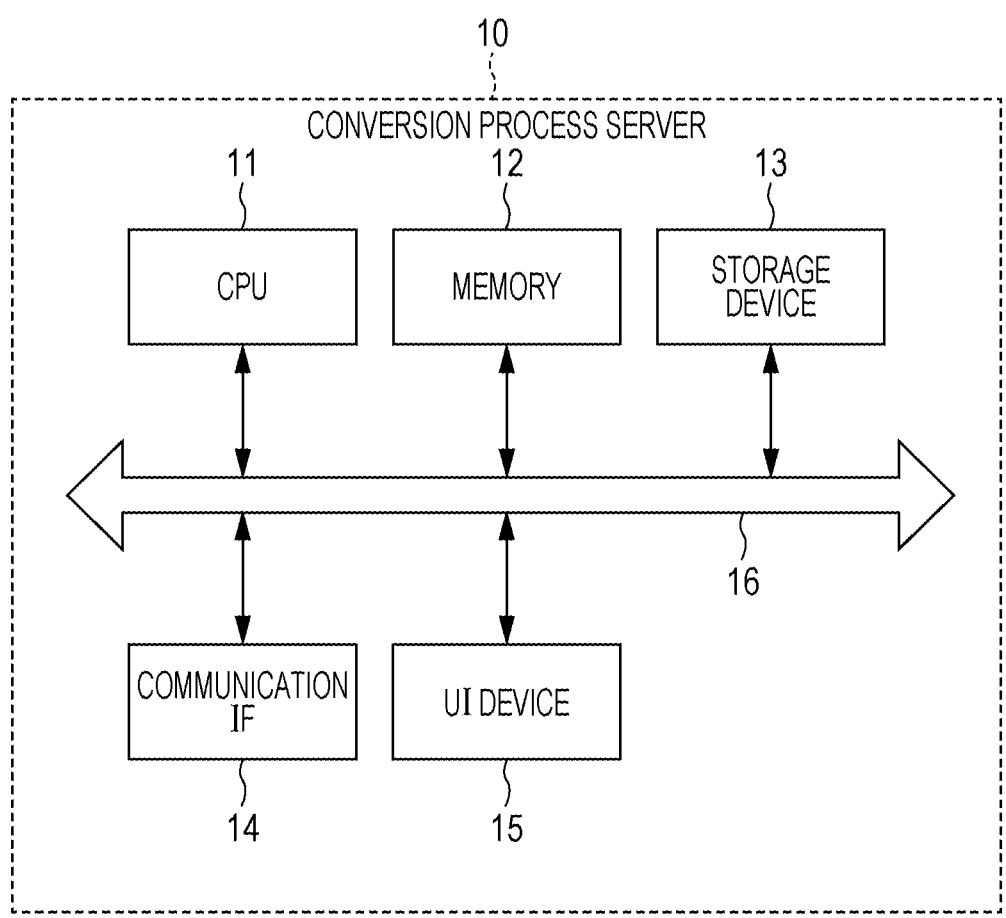
FIG. 4 is a block diagram illustrating a hardware configuration of the conversion process server according to the exemplary embodiment of the present invention.

FIG. 4 illustrates a hardware configuration of the conversion process server 10.

As shown in FIG. 4, the conversion process server 10 includes a central processing unit (CPU) 11, a memory 12, a storage device 13, such as a hard disk drive (HDD), a communication interface (IF) 14 that exchanges data with an external device via the network 40, and a user interface (UI) device 15 including a touchscreen or a liquid crystal display as well as a keyboard. These components are connected to one another by a control bus 16.

The CPU 11 executes a predetermined process based on a control program stored in the memory 12 or the storage device 13 so as to control the operation of the conversion process server 10. Although the CPU 11 is described as being configured to read the control program from the memory 12 or the storage device 13 and execute the control program in this exemplary embodiment, the control program may be provided to the CPU 11 by being stored in a storage medium, such as a compact disc read-only memory (CD-ROM).

Figure 5:
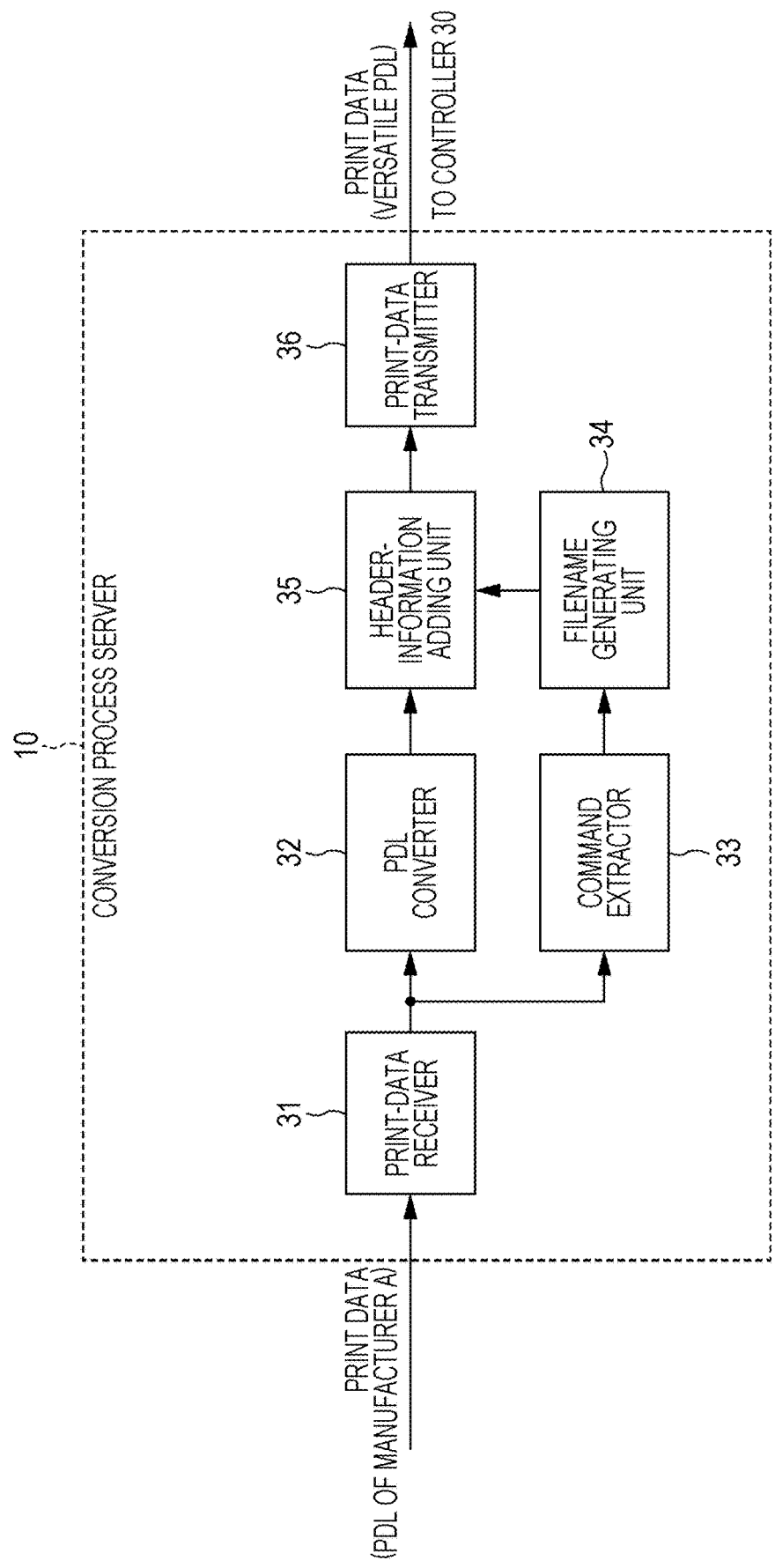
FIG. 5 is a block diagram illustrating a functional configuration of the conversion process server according to the exemplary embodiment of the present invention.

FIG. 5 is a block diagram illustrating a functional configuration of the conversion process server 10 realized by executing the above-described control program.

As shown in FIG. 5, the conversion process server 10 according to this exemplary embodiment includes a print-data receiver 31, a PDL converter 32, a command extractor 33, a filename generating unit 34, a header-information adding unit 35, and a print-data transmitter 36.

The print-data receiver 31 receives, for example, print data described in a PDL unique to manufacturer A from the controller 30 or from a storage medium.

The PDL converter 32 converts the print data received by the print-data receiver 31 and described in the PDL unique to manufacturer A into print data described in a description language different from the above PDL, such as a PDL in the PS format, which is a versatile description language not dependent on a printer that is to execute the printing process.

The command extractor 33 extracts command information related to an imposition process from the print data received by the print-data receiver 31 and described in the PDL unique to manufacturer A.

The filename generating unit 34 analyzes the command information extracted by the command extractor 33 so as to generate information for specifying imposition information to be used, specifically, filename information of the imposition information, from multiple pieces of imposition information in which different imposition processes are defined and which are stored in a printer that is to execute the printing process.

In this exemplary embodiment, the printers 20A and 20B that are to execute the printing process store therein multiple pieces of imposition information in which different imposition processes are defined. Specifically, each of the printers 20A and 20B preliminarily stores therein imposition information (print-layout definition information) containing at least multiple pieces of information from among the number of impositions for which an imposition process is to be performed, the imposition direction, the logical page size, the output sheet size, and information for designating duplex printing or simplex printing. The imposition information will be described in detail later.

The imposition information is, for example, information for designating page imposition (allocation) when performing a printing process, such as information for designating the contents of an imposition process (aggregation process) when performing a printing process, information for designating the sheet size, and information for designating whether duplex printing or simplex printing is to be executed. The term "imposition process" in this case refers to a process of performing printing such that multiple logical pages are included within a single physical page.

The multiple pieces of imposition information stored in the printers 20A and 20B are stored in the printers 20A and 20B in correspondence with filenames expressing the contents of imposition processes to be executed. In other words, a filename of imposition information expresses the contents of an imposition process to be executed based on a predetermined rule.

The header-information adding unit 35 adds the filename information generated by the filename generating unit 34 as header information to the print data described in the versatile PDL converted by the PDL converter 32.

The print-data transmitter 36 transmits the print data described in the versatile PDL, to which the filename information of the imposition information is added as the header information by the header-information adding unit 35, to the controller 30. In this print data, the filename expressing the contents of the imposition process is included in the header information. The print data is transmitted to the printers 20A and 20B via the controller 30.

As described above, in the printing system according to this exemplary embodiment, the printers 20A and 20B that are to execute the printing process store therein the multiple pieces of imposition information (print-layout definition information) in which different imposition processes are defined.

Figure 6:
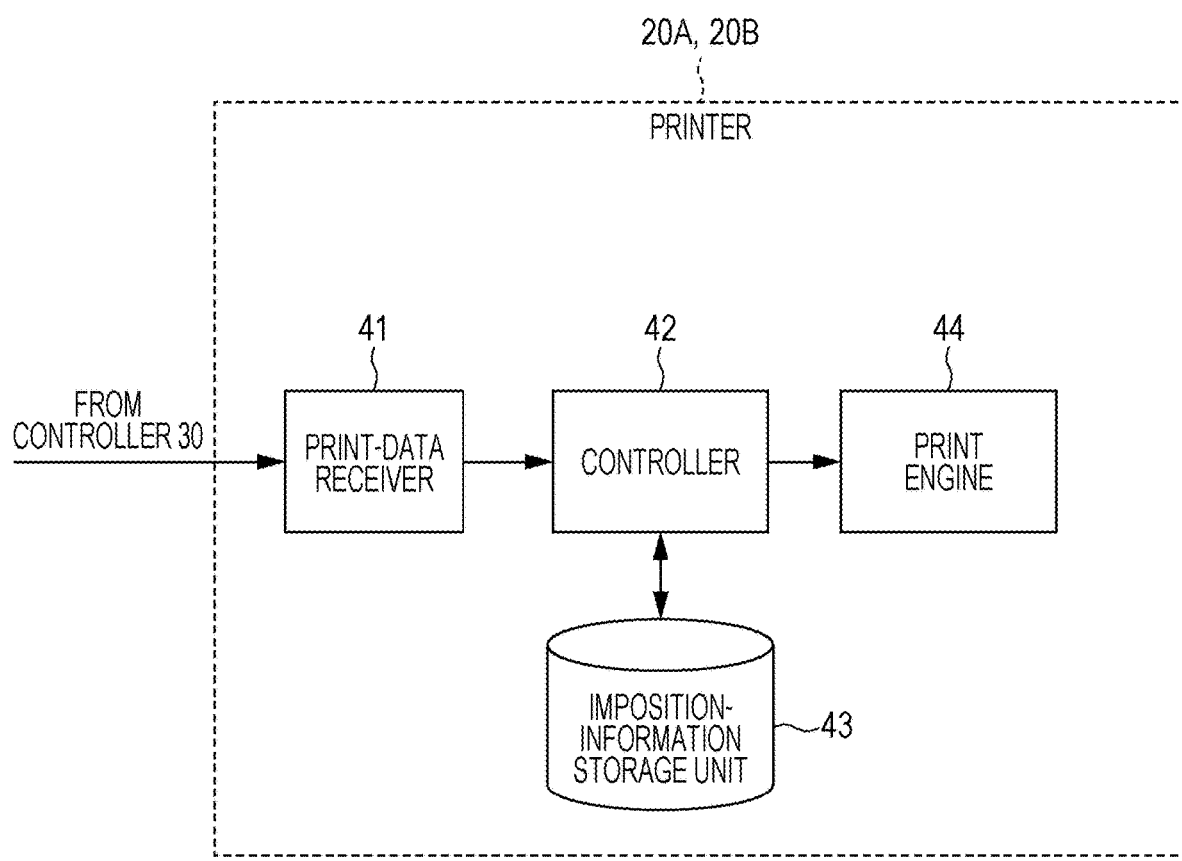
FIG. 6 illustrates a functional configuration of each printer.

A functional configuration of the printers 20A and 20B will now be described with reference to FIG. 6.

Each of the printers 20A and 20B includes a print-data receiver 41, a controller 42, an imposition-information storage unit 43, and a print engine 44.

The imposition-information storage unit 43 stores therein imposition information in which different page impositions (allocations) including the above-described imposition processes are defined.

When the print-data receiver 41 receives print data from the controller 30, the controller 42 reads the imposition information corresponding to the filename included in the header information of the received print data from the imposition-information storage unit 43 and refers to the read imposition information so as to perform an imposition process and to cause the print engine 44 to execute a printing process.

Specifically, if four impositions are designated as the number of impositions in this imposition information, the controller 42 executes an imposition process such that four logical pages are arranged in a single physical page when the print data is rasterized, and subsequently commands the print engine 44 to perform a printing process.

Next, a specific example of the imposition information stored in the imposition-information storage unit 43 will be described with reference to FIG. 7.

As shown in FIG. 7, the imposition information includes a filename, information for designating duplex printing or simplex printing (duplex/simplex), a logical page size, logical page orientation, the number of impositions (number of divisions), the imposition direction (dividing direction), and an output page size. The imposition information shown in FIG. 7 is merely an example. In addition to the information shown in FIG. 7, information about the spacing between logical pages when performing an imposition process, origin position information about an output page, and so on may be included.

The filename of this imposition information expresses the contents of an imposition process to be executed based on a predetermined rule. Such a rule for the filename of the imposition information will be described with reference to FIG. 8.

As shown in FIG. 8, the first character of the filename is the information for designating duplex printing or simplex printing. For example, a character "D" indicates duplex printing, and a character "S" indicates simplex printing. The next character group indicates the logical-page size and orientation. For example, "A4" indicates A4 size and "Land" indicates landscape orientation. The term "Port" implies that the logical page orientation is portrait orientation.

The next character group indicates the number of impositions and the imposition direction when an imposition process is to be performed. For example, "1up" indicates no impositions, "2up" indicates two impositions, "4up" indicates four impositions, and "8up" indicates eight impositions. Furthermore, "L" indicates that the imposition direction is the horizontal direction, and "P" indicates that the imposition direction is the vertical direction. Such various imposition patterns will be described in detail later.

Finally, the last character group of the imposition information indicates the output page size. In the example shown in FIG. 7, "19×12" indicates that the horizontal width of an output page is 19 inches and the vertical width is 12 inches.

In this exemplary embodiment, PDL conversion is performed in the conversion process server 10, while an imposition process is not preliminarily performed by executing the imposition process designated in the print data before the PDL conversion. The reason for not performing the PDL conversion process and the imposition process simultaneously in the conversion process server 10 according to this exemplary embodiment will be described with reference to FIG. 9.

The following description relates to a case where, supposing that a conversion process and an imposition process are both executed in the conversion process server 10, as shown in FIG. 9, for example, the imposition process is executed for four impositions when an imposition process for four impositions is designated. Furthermore, the following description also relates to a case where there are three printers 71 to 73 of manufacturer B as printers that may possibly execute a printing process.

The printers 71 to 73 of manufacturer B may sometimes include printers that perform printing on cut sheets and printers that perform printing on continuous sheets, and may sometimes perform duplex printing and simplex printing even in the case where printing is to be performed on cut sheets. In the case where printing is to be performed on a continuous sheet, there may be a case where duplex printing is performed on the continuous sheet by using a system configuration including two printers, as shown in FIG. 1.

Therefore, even if an imposition process is preliminarily executed in the conversion process server 10, there is a possibility that the imposition process may be not optimal for all of the printers 71 to 73 of manufacturer B and may thus result in an unintended or undesired imposition process. For example, the order in which logical pages are arranged within a physical page may differ between a continuous sheet and a cut sheet even when the imposition direction is the same.

There are printers that are capable of performing inter-page editing, such as duplex printing and an imposition process, within the printers so that print data in units of pages complies with the configuration of such printers. In the exemplary embodiment of the present invention, an inter-page editing function executable in a printer is used so that inter-page editing, such as an imposition process, a command for which is included in print data (i.e., print job) received by the print-data receiver 31, is executed.

Figure 10:
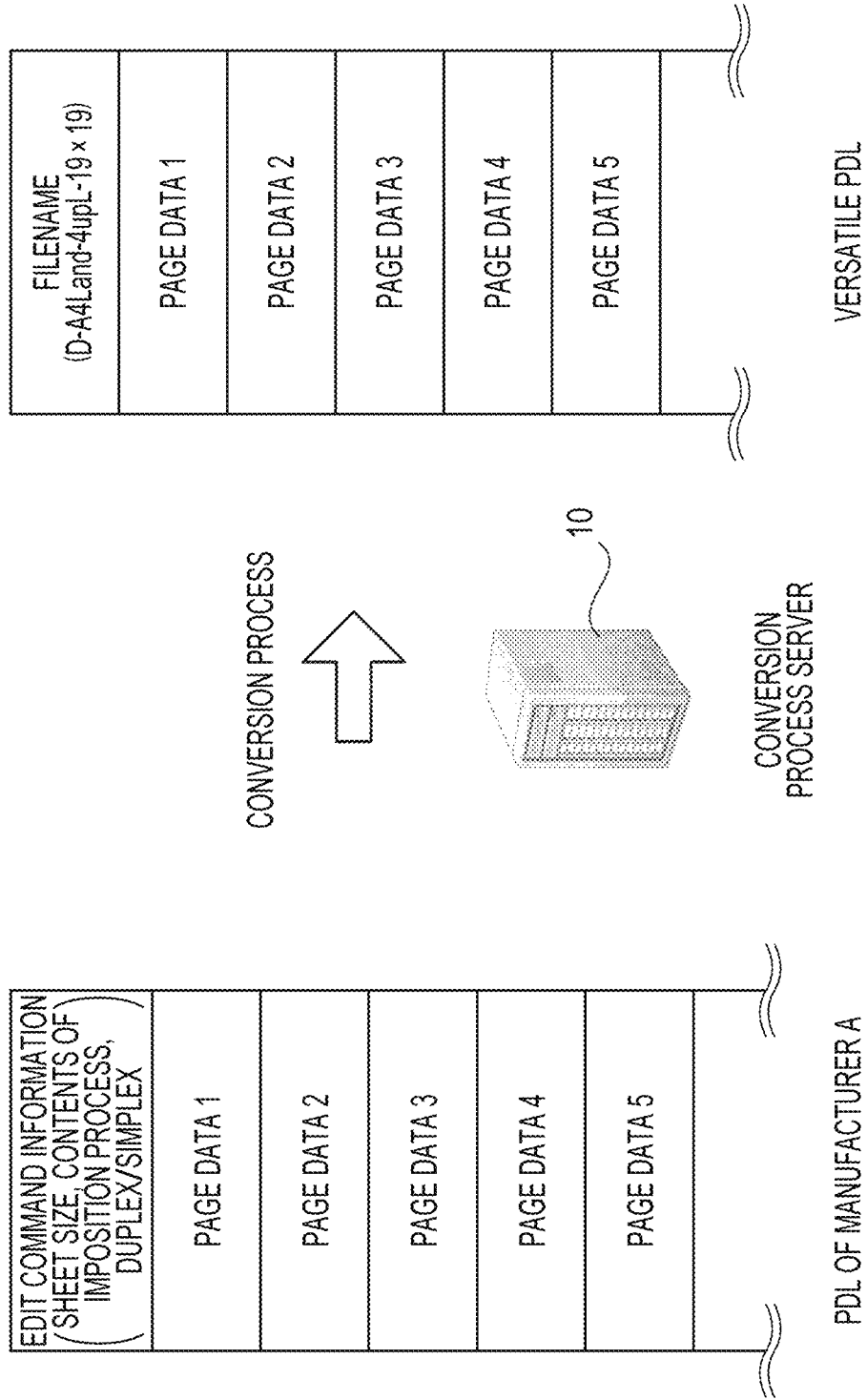
FIG. 10 illustrates a state where print data described in a PDL unique to manufacturer A is converted into versatile print data by the conversion process server.

Therefore, as shown in FIG. 10, when converting print data described in a PDL unique to manufacturer A into versatile print data, for example, the conversion process server 10 according to this exemplary embodiment refers to edit command information in the print data before the conversion so as to generate a filename of imposition information, which is to be used when executing a printing process, from multiple pieces of imposition information stored in the printer, and causes the filename to be included in header information of the print data after the PDL conversion. Because the processing contents of the edit command information are specified by the filename generating unit 34, the specified processing contents are expressed (normalized) by the filename, thereby allocating a command (i.e., imposition information) for the inter-page editing function of the printer that realizes the processing contents.

In each printer, imposition information for executing an imposition process optimal for the printer is stored. Thus, when a printing process is to be executed in each printer based on the print data after the PDL conversion, the printer corresponding to the filename of the imposition information is commanded to perform inter-page editing (i.e., an imposition process) of the printer by referring to the filename, whereby an imposition process optimal for each printer is executed.

Next, examples of various imposition patterns described above will be described with reference to FIGS. 11A to 14B.

Figure 11A:
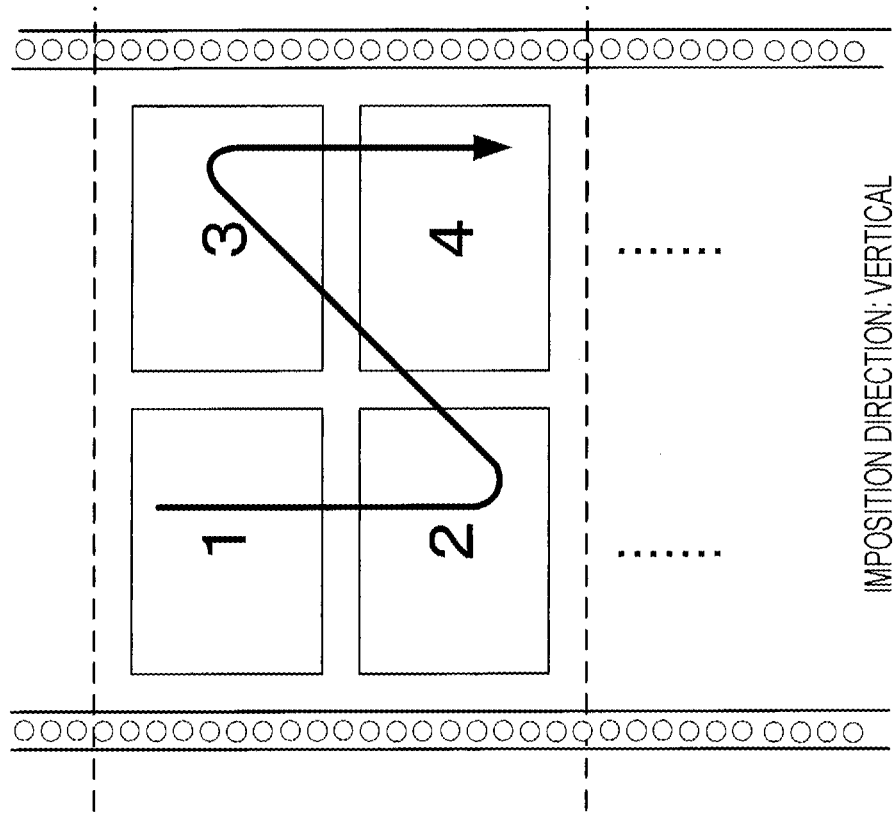
FIGS. 11A and 11B illustrate a first example of an imposition pattern.
Figure 11B:
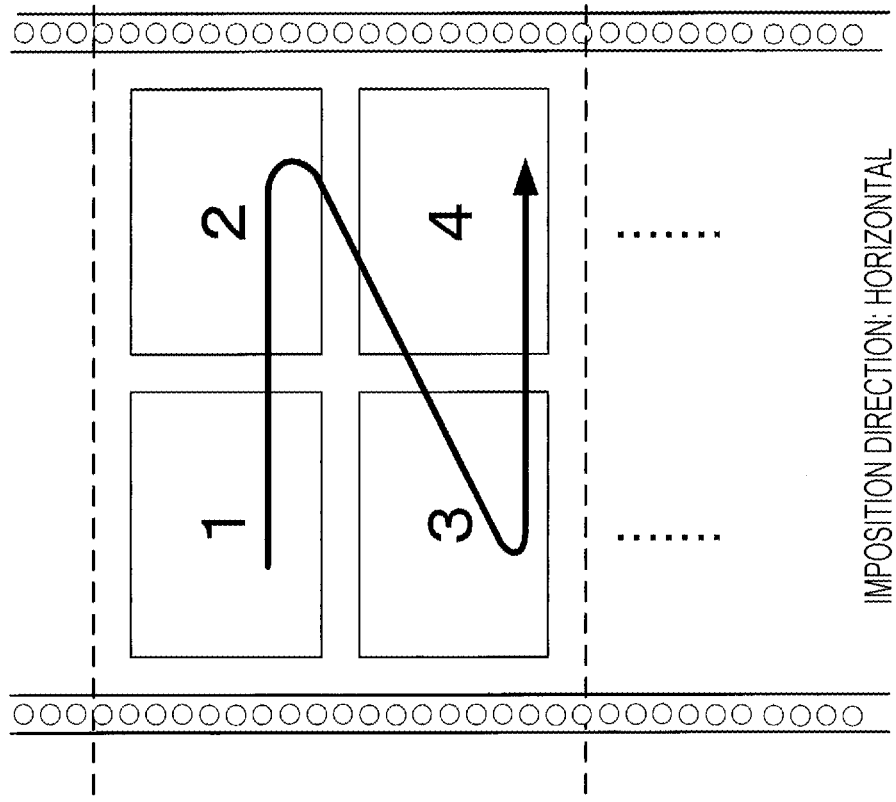

FIG. 11A illustrates an example of an imposition pattern in a case where the imposition direction is the horizontal direction in an imposition process for four impositions when simplex printing is performed on a continuous sheet. FIG.

11B illustrates an example of an imposition pattern in a case where the imposition direction is the vertical direction in an imposition process for four impositions when simplex printing is performed on a continuous sheet.

Figure 12:
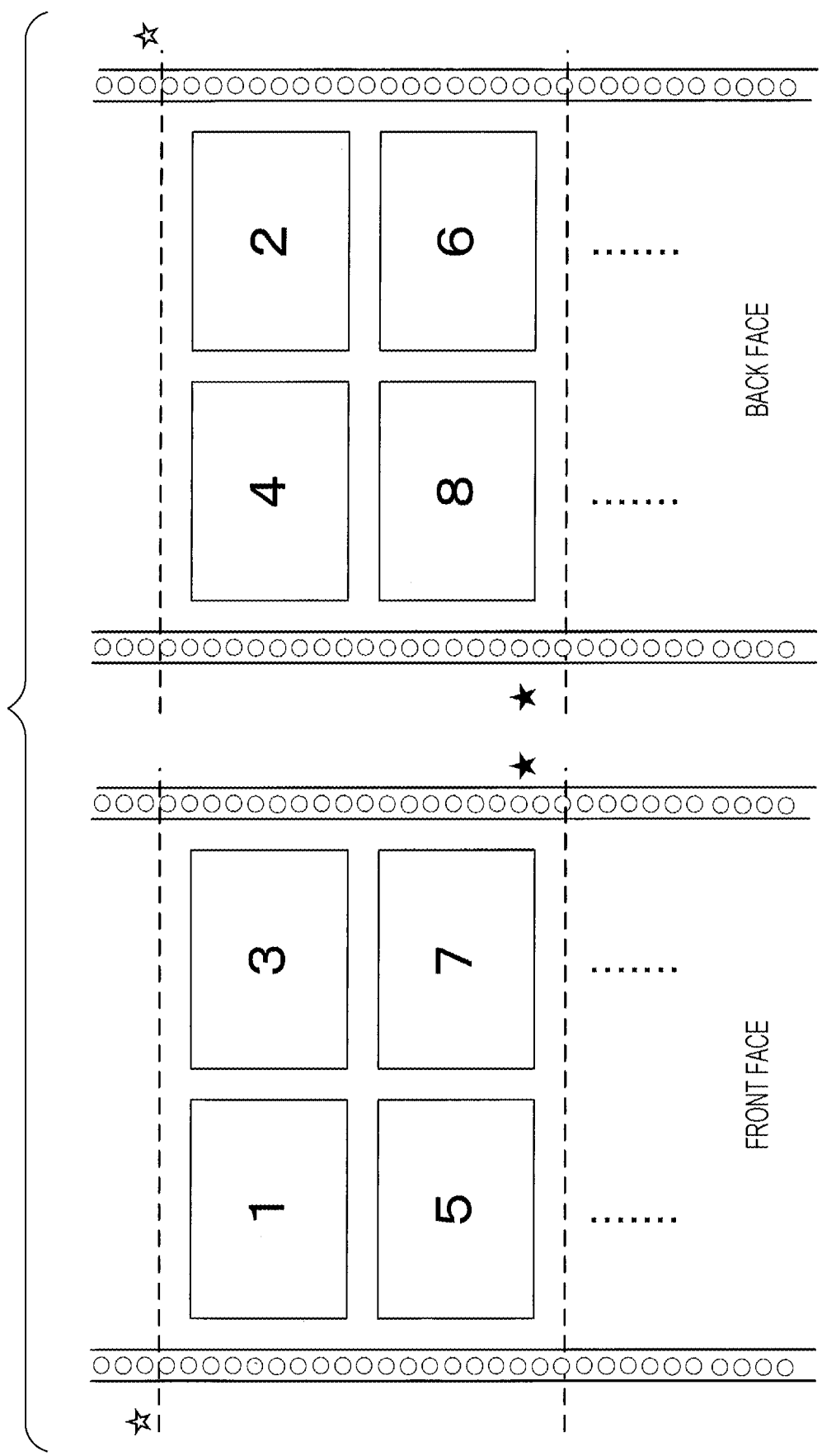
FIG. 12 illustrates a second example of an imposition pattern.

FIG. 12 illustrates an example of an imposition pattern in a case where the imposition direction is the horizontal direction in an imposition process for four impositions when duplex printing is performed on a continuous sheet.

Figure 13B:
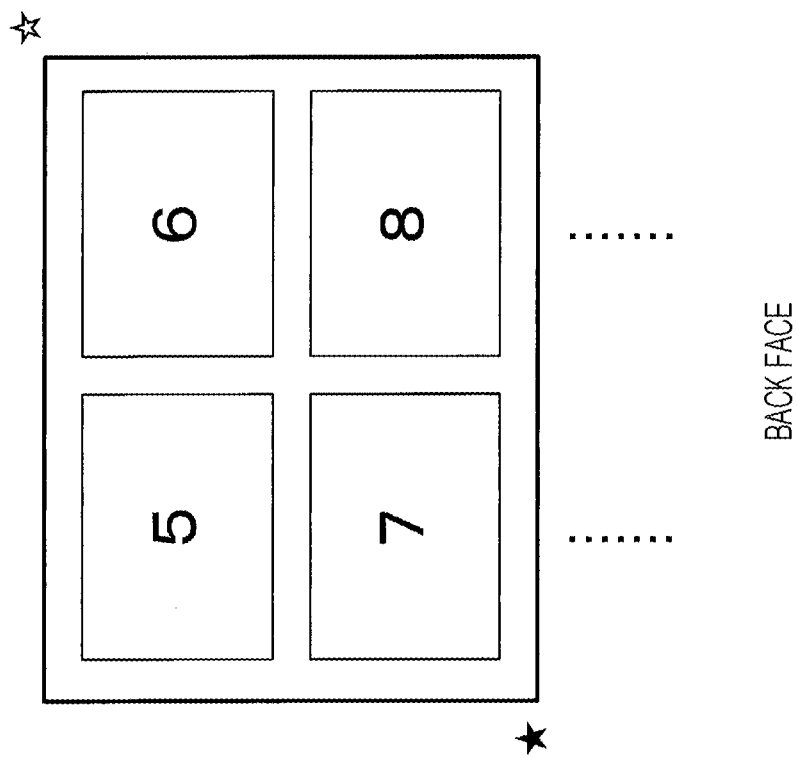
FIGS. 13A and 13B illustrate a third example of an imposition pattern.
Figure 13A:
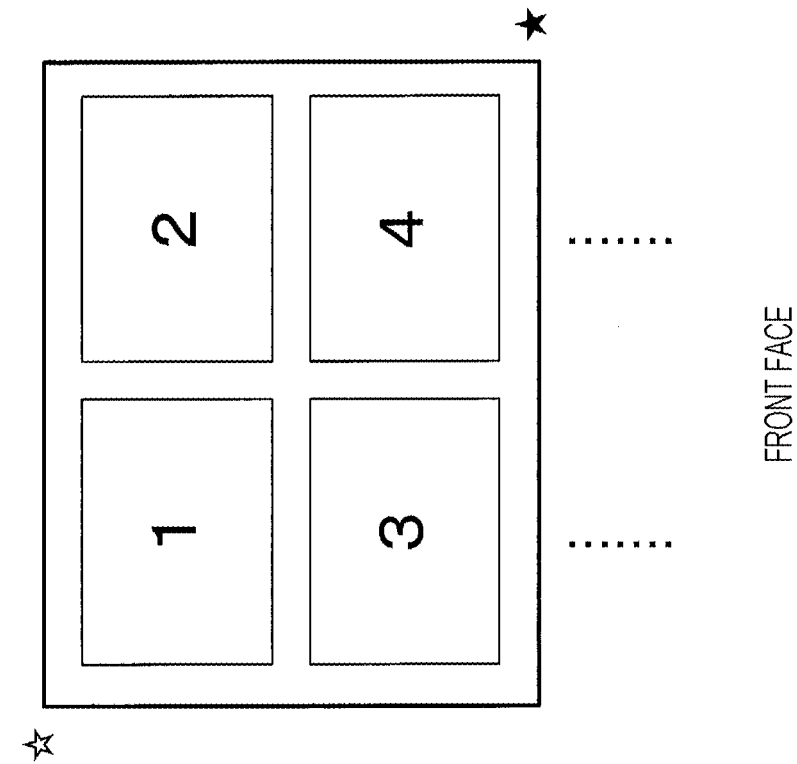

FIGS. 13A and 13B illustrate an example of an imposition pattern in a case where the imposition direction is the horizontal direction in an imposition process for four impositions when duplex printing is performed on a cut sheet.

Figure 14A:
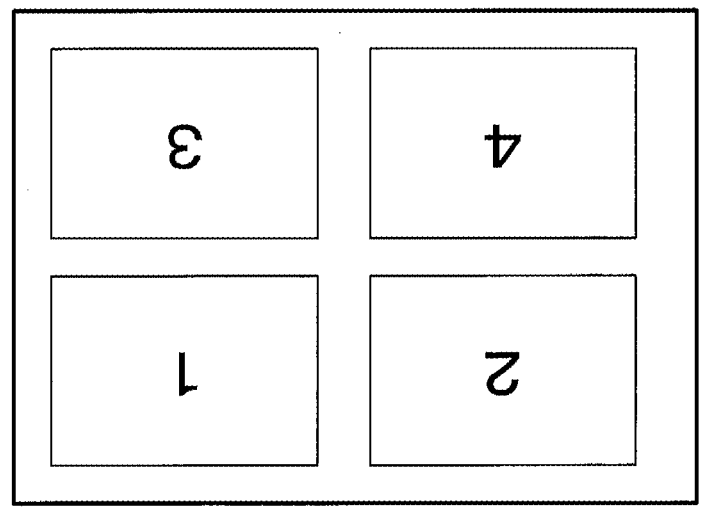
FIGS. 14A and 14B illustrate a fourth example of an imposition pattern.
Figure 14B:
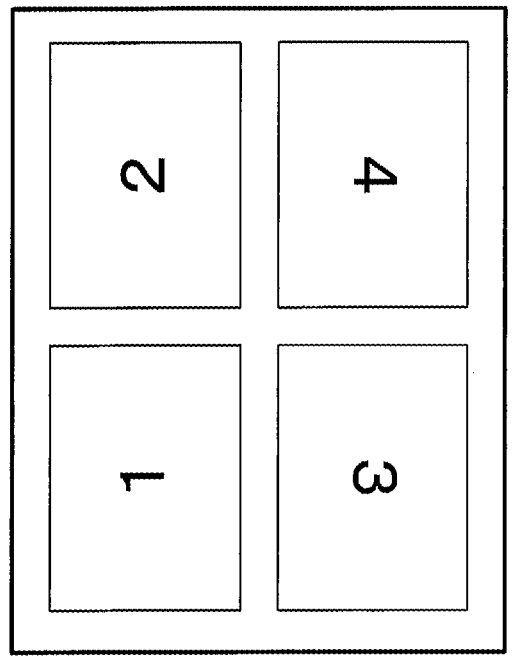

FIG. 14A illustrates an example of an imposition pattern in an imposition process for four impositions in a case where logical pages are set in the portrait orientation when simplex printing is performed on a cut sheet. FIG. 14B illustrates an example of an imposition pattern in an imposition process for four impositions in a case where first and second pages and third and fourth pages are oriented in opposite directions from each other in the vertical direction when simplex printing is performed on a cut sheet.

As shown in FIGS. 11A to 14B, there are various imposition patterns depending on, for example, a cut sheet or a continuous sheet, duplex printing or simplex printing, the number of impositions, the imposition direction, the orientation of each logical page, and the output page size. Therefore, in each printer that is to execute a printing process, imposition information for defining an imposition process optimal for the printer is stored, so that, by simply generating a filename in the conversion process server 10, an optimal imposition process is executed in the printer.

In other words, even with imposition information having the same filename, there may be a case where different imposition processes are defined between printers storing therein the imposition information. Moreover, even with print data with imposition information having the same filename added thereto, there may be a case where the imposition process varies from printer to printer executing a printing process.

Another Exemplary Embodiment

In the exemplary embodiment described above, it is assumed that imposition information (print-layout definition information) of every type that may possibly be used is preliminarily stored (registered) in each of the printers 20A and 20B that is to execute a printing process.

However, preliminarily registering imposition information of every pattern, including those with a low usage possibility, in each of the printers 20A and 20B is time-consuming. In particular, if there is a large number of combinations of imposition processes, an enormous number of combination patterns has to be registered, thus resulting in an increased working load on the registrant.

In a case where an input error occurs when imposition information is registered, there is a possibility of an occurrence of a conflicted state where the filename and the contents of the registered imposition process do not match.

Therefore, in another exemplary embodiment of the present invention, a new configuration is added to that in the above-described exemplary embodiment so as to cope with the above-described problem.

In a printing system according to this exemplary embodiment of the present invention, the conversion process server 10 shown in FIG. 5 is replaced with a conversion process server 10a shown in FIG. 15. In this exemplary embodiment of the present invention, components similar to those in the above-described exemplary embodiment are given the same reference signs.

As shown in FIG. 15, the conversion process server 10a according to this exemplary embodiment of the present invention includes an imposition-information generating unit 37 and an imposition-information forwarding controller 38 in addition to the components of the conversion process server 10 shown in FIG. 5.

The imposition-information generating unit 37 generates imposition information from command information related to an imposition process extracted by the command extractor 33 and from a filename generated by the filename generating unit 34.

The imposition-information forwarding controller 38 controls forwarding of the imposition information generated by the imposition-information generating unit 37 to the printers 20A and 20B.

The imposition-information forwarding controller 38 is constituted of an inquiry unit 51, a registration command unit 52, a confirming unit 53, and an overwrite command unit 54.

The inquiry unit 51 inquires the printers 20A and 20B about whether or not the imposition information specified based on the filename generated by the filename generating unit 34 is registered (stored).

If there is a reply indicating that the imposition information specified based on the filename generated by the filename generating unit 34 is not registered in response to the inquiry from the inquiry unit 51, the registration command unit 52 commands the printers 20A and 20B to newly register imposition information in which an imposition process commanded based on the command information extracted by the command extractor 33 is defined.

If there is a reply indicating that the imposition information specified based on the filename generated by the filename generating unit 34 is registered in response to the inquiry from the inquiry unit 51, the confirming unit 53 confirms whether or not the contents of the imposition process defined based on the imposition information and the filename generated by the filename generating unit 34 conflict with each other.

Specifically, the confirming unit 53 receives the registered imposition information from the printers 20A and 20B and confirms whether or not the imposition information and the filename conflict with each other, that is, whether or not the contents of the imposition process set in the imposition information match the contents defined based on the filename.

If the confirming unit 53 confirms that the contents of the imposition process defined based on the imposition information and the information generated by the filename generating unit 34 conflict with each other, the overwrite command unit 54 commands the printers 20A and 20B to write the imposition information, in which the imposition process commanded based on the command information extracted by the command extractor 33 is defined, over the imposition information stored in correspondence with the filename generated by the filename generating unit 34.

Next, the operation of the conversion process server 10a in the printing system according to this exemplary embodiment of the present invention will be described in detail with reference to the drawings. In order to simplify the description, only the exchanging of data between the conversion process server 10a and the printer 20A will be described below.

Figure 16:
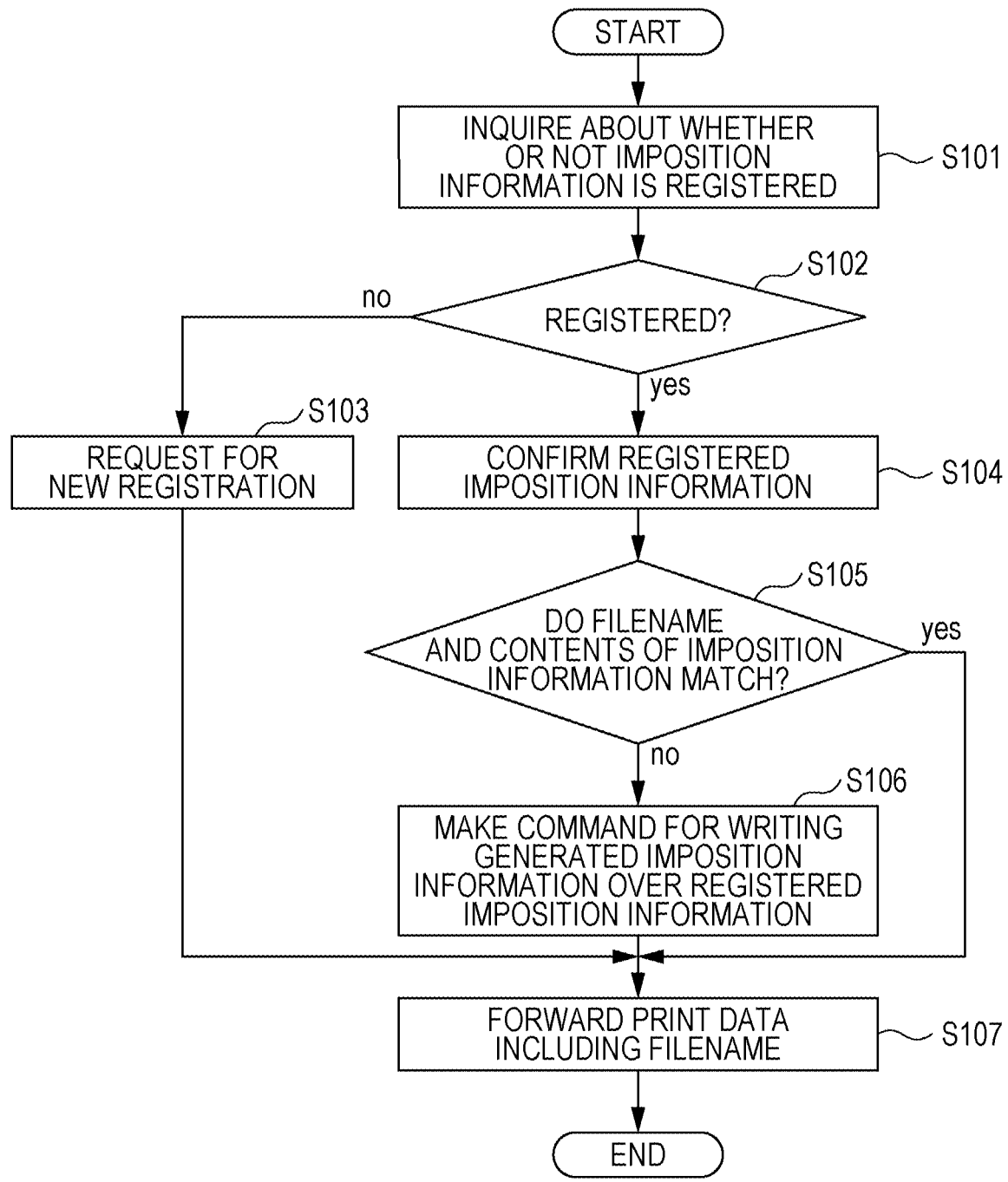
FIG. 16 is a flowchart illustrating the operation of the conversion process server according to another exemplary embodiment of the present invention.

FIG. 16 illustrates a flowchart of the operation performed by the conversion process server 10a.

When an imposition process is included in print data received by the print-data receiver 31 and a filename of imposition information is generated by the filename generating unit 34, the inquiry unit 51 inquires the printer 20A in step S101 about whether or not the imposition information having the generated filename is registered.

Then, if the printer 20A transmits a reply indicating that the inquired imposition information is not registered in response to this inquiry (NO in step S102), the registration command unit 52 of the conversion process server 10a requests the printer 20A in step S103 to newly register imposition information generated by the imposition-information generating unit 37. As a result, new imposition information is newly registered in the printer 20A.

Subsequently, in the conversion process server 10a, print data in which the filename of the imposition information is added to header information is forwarded from the print-data transmitter 36 to the controller 30 in step S107.

If the printer 20A transmits a reply indicating that the imposition information is registered in response to the inquiry from the inquiry unit 51 (YES in step S102), the confirming unit 53 performs a confirmation process in step S105 for confirming where there is an error in the imposition information registered in the printer 20A.

Specifically, the confirming unit 53 confirms whether or not the filename generated by the filename generating unit 34 and the registered contents of the imposition information registered in the printer 20A match based on a predetermined rule.

If such a confirmation process is not necessary, the print data may be forwarded from the print-data transmitter 36 to the controller 30 when the printer 20A transmits a reply indicating that the imposition information is registered in response to the inquiry from the inquiry unit 51.

Then, if the filename and the registered contents of the imposition information match (YES in step S105), the print data is forwarded from the print-data transmitter 36 to the controller 30 in step S107.

If the filename and the registered contents of the imposition information do not match (NO in step S105), the overwrite command unit 54 commands the printer 20A in step S106 to write the imposition information generated by the imposition-information generating unit 37 over the registered imposition information.

Subsequently, in step S107, print data in which the generated filename is included in the header information is forwarded from the print-data transmitter 36 to the controller 30.

Next, exchanging of data between the conversion process server 10a and the printer 20A will be described with reference to FIGS. 17 to 19.

Figure 17:
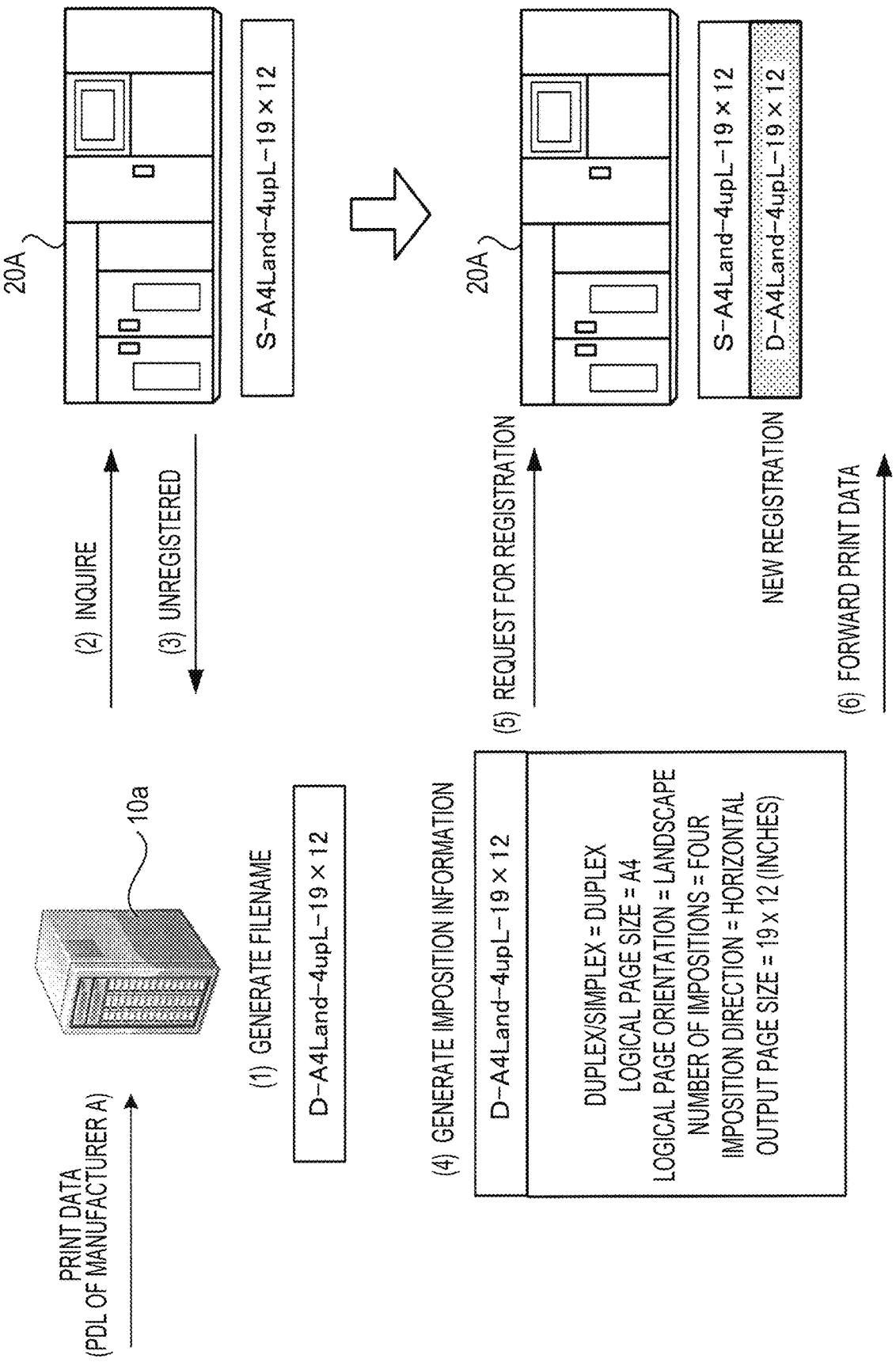
FIG. 17 is a diagram for explaining how data is exchanged in a case where imposition information having a filename generated in the conversion process server is unregistered in a first printer.

The following description with reference to FIG. 17 relates to how data is exchanged in a case where imposition information having a filename generated in the conversion process server 10a is unregistered in the printer 20A.

In a first step, the filename generating unit 34 of the conversion process server 10a generates a filename of imposition information based on command information extracted from print data. In this case, it is assumed that a filename "D-A4Land-4upL-19×12" is generated.

Then, in a second step, the inquiry unit 51 of the conversion process server 10a inquires the printer 20A about whether or not imposition information having this filename is registered.

In a third step, since imposition information having the filename "D-A4Land-4upL-19×12" is not registered in the printer 20A, the printer 20A transmits, to the conversion process server 10a, a reply indicating that imposition information having the filename regarding the received inquiry is unregistered.

Then, in a fourth step, the imposition-information generating unit 37 in the conversion process server 10a generates imposition information having the filename "D-A4Land-4upL-19×12".

Subsequently, in a fifth step, the registration command unit 52 transmits, to the printer 20A, a registration request with regard to the generated imposition information having the filename "D-A4Land-4upL-19×12". As a result, the imposition information having the filename "D-A4Land-4upL-19×12" requested for registration is newly registered in the printer 20A.

In a sixth step, since the imposition information in which the imposition process of the print data based on which a printing process is to be performed is defined is registered in the printer 20A, the conversion process server 10a forwards, to the controller 30, the print data in which the generated filename is included in the header information.

Figure 18:
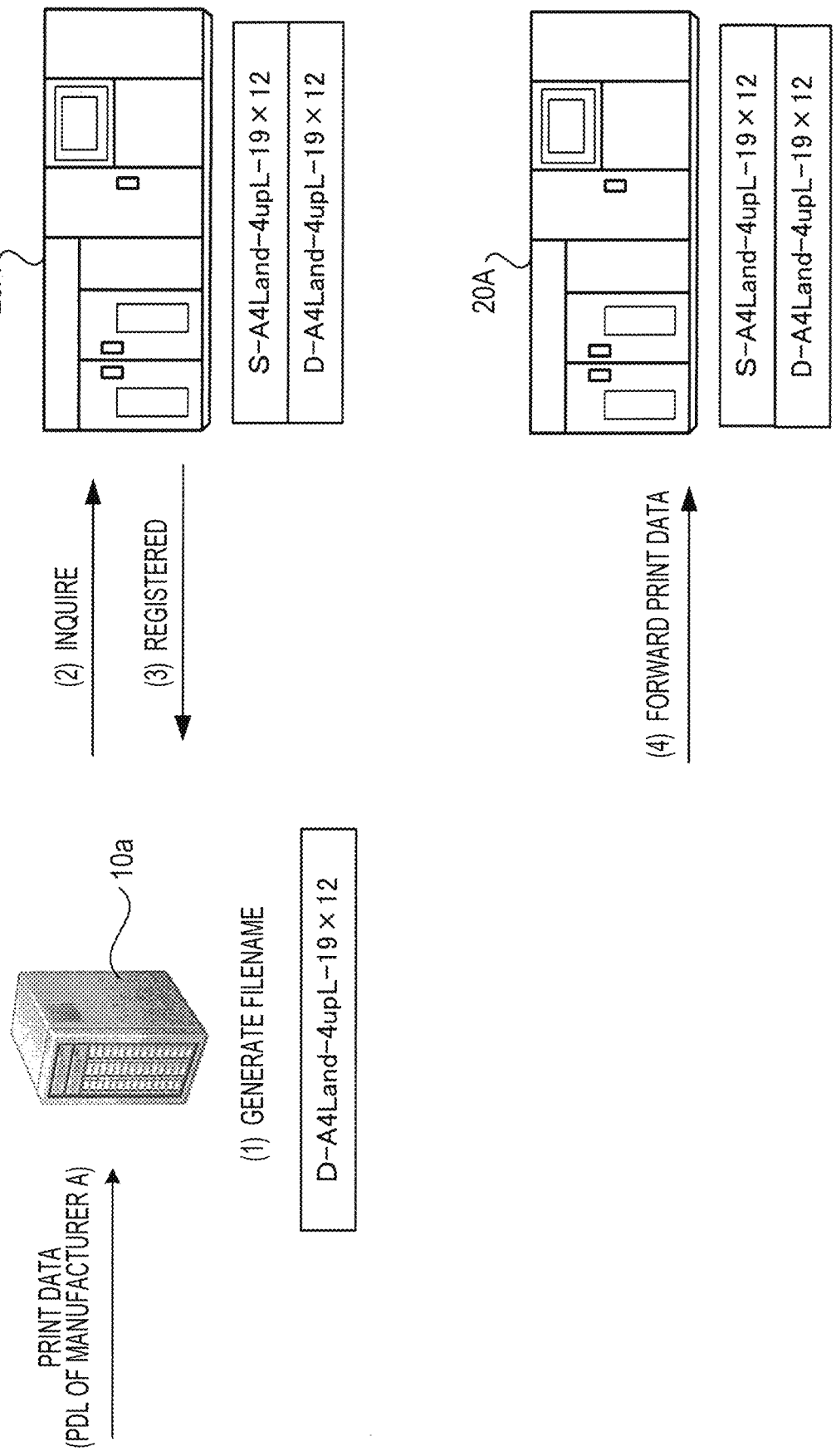
FIG. 18 is a diagram for explaining how data is exchanged in a case where imposition information having a filename generated in the conversion process server is registered in the first printer and a process for confirming the contents of the registered imposition information is not performed.

Next, the following description with reference to FIG. 18 relates to how data is exchanged in a case where imposition information having a filename generated in the conversion process server 10a is registered in the printer 20A and a process for confirming the contents of the registered imposition information is not performed.

In a first step, the filename generating unit 34 of the conversion process server 10a generates a filename of imposition information based on command information extracted from print data. In this case, it is assumed that a filename "D-A4Land-4upL-19×12" is generated.

Then, in a second step, the inquiry unit 51 of the conversion process server 10a inquires the printer 20A about whether or not imposition information having this filename is registered.

In a third step, since imposition information having the filename "D-A4Land-4upL-19×12" is registered in the printer 20A, the printer 20A transmits, to the conversion process server 10a, a reply indicating that the imposition information having the filename regarding the received inquiry is registered.

As a result, in a fourth step, the print-data transmitter 36 in the conversion process server 10a forwards, to the controller 30, the print data in which the generated filename is included in the header information. In this case, since it is confirmed that the imposition information having the filename included in the header information of the print data is registered in the printer 20A, an imposition process defined based on the imposition information corresponding to the filename is performed in the printer 20A.

Figure 19:
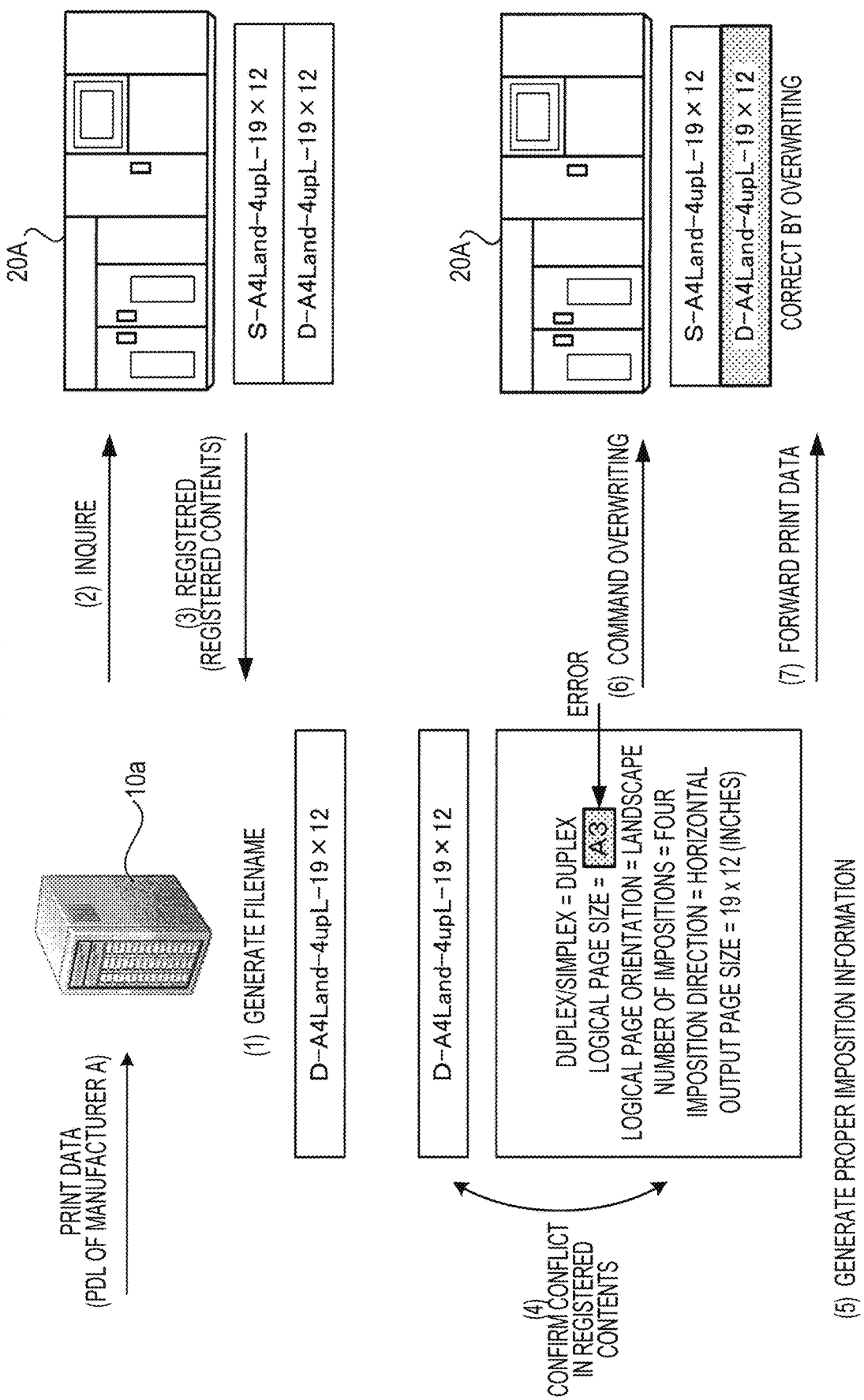
FIG. 19 is a diagram for explaining how data is exchanged in a case where imposition information having a filename generated in the conversion process server is registered in the first printer and the process for confirming the contents of the registered imposition information is performed.

Finally, the following description with reference to FIG. 19 relates to how data is exchanged in a case where imposition information having a filename generated in the conversion process server 10a is registered in the printer 20A and the process for confirming the contents of the registered imposition information is performed.

In a first step, the filename generating unit 34 of the conversion process server 10a generates a filename of imposition information based on command information extracted from print data. In this case, it is assumed that a filename "D-A4Land-4upL-19×12" is generated.

Then, in a second step, the inquiry unit 51 of the conversion process server 10a inquires the printer 20A about whether or not imposition information having this filename is registered.

In a third step, since imposition information having the filename "D-A4Land-4upL-19×12" is registered in the printer 20A, the printer 20A transmits, to the conversion process server 10a, a reply indicating that the imposition information having the filename regarding the received inquiry is registered together with information about the registered contents.

Then, in a fourth step, the confirming unit 53 of the conversion process server 10a confirms whether or not the registered contents in the reply and the filename conflict with each other. As shown in FIG. 19, it is assumed that there is a conflict due to the sheet size being "A3" in the registered contents in the printer 20A regardless of the fact that the filename is "D-A4Land-4upL-19×12".

In a fifth step, since the confirmation result in the confirming unit 53 indicates that the filename and the registered contents of the imposition information do not match, the imposition-information generating unit 37 generates new imposition information having the filename "D-A4Land-4upL-19×12".

Then, in a sixth step, the overwrite command unit 54 commands the printer 20A to write the new generated imposition information over the registered contents of the imposition information registered in correspondence with the filename "D-A4Land-4upL-19×12". As a result, the imposition information having the filename "D-A4Land-4upL-19×12" is overwritten in the printer 20A so that the erroneous registered contents are corrected.

Subsequently, in a seventh step, the print-data transmitter 36 in the conversion process server 10a forwards, to the controller 30, the print data in which the generated filename is included in the header information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A converting apparatus comprising:
    a converter that converts print data described in a first description language into print data described in a second description language;
    an extractor that extracts command information related to an imposition process from the print data described in the first description language; and
    a generating unit that analyzes the command information extracted by the extractor so as to generate information for specifying print-layout definition information to be used from a plurality of pieces of print-layout definition information stored in a printer that is to execute a printing process, the plurality of pieces of print-layout definition information having different imposition processes defined therein.

2. The converting apparatus according to claim 1, further comprising:
    an adding unit that adds the information generated by the generating unit to the print data described in the second description language and converted by the converter.

3. The converting apparatus according to claim 1, wherein the plurality of pieces of print-layout definition information stored in the printer are stored within the printer in correspondence with filenames expressing contents of the imposition processes to be executed, and
wherein the information for specifying the print-layout definition information to be used from the plurality of pieces of print-layout definition information is filename information of the print-layout definition information.

4. The converting apparatus according to claim 3, wherein the filename information of the print-layout definition information expresses, based on a predetermined rule, the contents of the imposition process to be executed.

5. The converting apparatus according to claim 1, wherein the print-layout definition information includes at least a plurality of pieces of information from among a number of impositions for which the imposition process is to be performed, an imposition direction, a logical page size, an output sheet size, and information for designating duplex printing or simplex printing.

6. The converting apparatus according to claim 1, wherein the second description language is a versatile description language not dependent on the printer that is to execute the printing process.

7. The converting apparatus according to claim 1, further comprising:
    an inquiry unit that inquires the printer about whether or not the print-layout definition information specified based on the information generated by the generating unit is stored; and
    a registration command unit, wherein in a case where a reply indicating that the print-layout definition information specified based on the information generated by the generating unit is not stored is received in response to the inquiry from the inquiry unit, the registration command unit commands the printer to newly register print-layout definition information in which the imposition process commanded based on the command information extracted by the extractor is defined.

8. The converting apparatus according to claim 1, further comprising:
    an inquiry unit that inquires the printer about whether or not the print-layout definition information specified based on the information generated by the generating unit is stored; and
    a confirming unit, wherein in a case where a reply indicating that the print-layout definition information specified based on the information generated by the generating unit is stored is received in response to the inquiry from the inquiry unit, the confirming unit confirms whether or not contents of the imposition process defined based on the print-layout definition information and the information generated by the generating unit conflict with each other.

9. The converting apparatus according to claim 8, further comprising:
    an overwrite command unit, wherein in a case where the confirming unit confirms that the contents of the imposition process defined based on the print-layout definition information and the information generated by the generating unit conflict with each other, the overwrite command unit commands the printer to write print-layout definition information, in which the imposition process commanded based on the command information extracted by the extractor is defined, over the print-layout definition information stored in correspondence with the information generated by the generating unit.

10. A printing system comprising:
a printer that stores therein a plurality of pieces of print-layout definition information in which different imposition processes are defined; and
a converting apparatus including
  a converter that converts print data described in a first description language into print data that is described in a second description language and based on which a printing process is executable in the printer,
  an extractor that extracts command information related to an imposition process from the print data described in the first description language, and
  a generating unit that analyzes the command information extracted by the extractor so as to generate information for specifying print-layout definition information to be used from the plurality of pieces of print-layout definition information stored in the printer.

11. A non-transitory computer readable medium storing a program causing a computer to execute a process, the process comprising:
  converting print data described in a first description language into print data described in a second description language;
  extracting command information related to an imposition process from the print data described in the first description language; and
  analyzing the extracted command information so as to generate information for specifying print-layout definition information to be used from a plurality of pieces of print-layout definition information stored in a printer that is to execute a printing process, the plurality of pieces of print-layout definition information having different imposition processes defined therein.

* * * * *